Patented Aug. 1, 1944

2,354,648

UNITED STATES PATENT OFFICE 2,354,648

DRILLING MUD

Donald C. Bond, Northbrook, Ill., assignor to The Pure Oil Company, Chicago, Ill., a corporation of Ohio No Drawing. Application November 6, 1939, Serial No. 303,024

22 Claims. (Cl. 252—8.5)

This invention relates to drilling wells and is primarily concerned with the production of an improved drilling mud and composition for preparation thereof for use in the drilling of wells, especially oil and gas wells, and with the method of drilling wells wherein such muds are used.

Drilling operations are usually conducted in the presence of a circulation of mud, that is, water containing mineral matter such as clay in a finely divided or deflocculated state. Such drilling muds are used in almost all rotary drilling operations for deep wells for oil and gas and simultaneously serve several functions. The mud is used primarily to carry the cuttings from the hole and to lubricate the drill bit, and in addition provides a lining or sheath on the walls of the drill hole to prevent either flow of water or gas from the sub-surface formation into the drill hole or to prevent loss of drilling fluid from the hole into the formations through which the hole is drilled. These muds are frequently made from material native to the formation in which the well is drilled, although it is often necessary to add additional material to the mud which will increase the specific gravity in order to increase the weight of the column of mud in the well and thereby offset the effect of high gas pressure. For this purpose weighting materials such as iron oxide and barytes are commonly used. Every natural clay contains particles of many orders of magnitude, some being coarse enough to settle out of a water suspension quickly and others being fine enough to stay suspended for indefinite periods. In a clay that is considered good for drilling mud purposes the fine material is predominant and is in an indefinitely fine state of subdivision, the finest being so small that much or most of it can be said to be in the form of a colloidal suspension or dispersion when the clay has been mixed with water. The suspended particles obey the general rules of colloidal dispersions, the degree of dispersion being increased by some ions and chemicals and being decreased by others. An increase in the degree of dispersion is termed "deflocculation" and a decrease in the state of dispersion is termed "flocculation." Flocculated clay may be in an equally finely divided state to that of deflocculated clay but the flocculated material will come together in flocculent, loose clumps or aggregates which settle readily from the medium in which it is dispersed, which in the case of drilling muds, is generally water. The stability of colloidal dispersions is also directly related to the charges on the dispersed particles. In general it may be said that strongly charged negative or positive particles form stable dispersions, whereas weakly charged or neutral particles tend to flocculate and settle out of the disperse medium.

When drilling in some formations such as, for example, certain shale formations, considerable difficulty has been experienced due to the property of these shale formations of swelling and sloughing when contacted with water or ordinary drilling mud. This property of some formations to hydrate or absorb water and swell sometimes occurs to such an extent that the holes cave and fill to such a degree that in the end the drilling has to be abandoned. Formations which have this property of absorbing water and swelling are, in the well drilling art, generally termed "heaving-shale" formations and it is with these types of formations that this invention is particularly concerned.

It is an object of this invention to provide an improved composition useful in the preparation of drilling mud.

It is another object of this invention to provide an improved drilling mud which will prevent the heaving of heaving-shale formations.

It is a still further object of this invention to provide a drilling mud in which the colloidal mineral content is dispersed as positively charged particles.

A further object of this invention is to provide an improved method for drilling in heaving-shale formations.

Various other objects and advantages will appear as the description of the invention proceeds.

Colloidally dispersed clay, obeying the general rules of colloidal dispersions, carries an electrical charge. Practically all naturally occurring finely divided clays such as kaolin and bentonite carry negative charges on the dispersed particles when dispersed in an aqueous medium. It is known that the shale in heaving-shale formation is generally bentonitic in character and that upon being dispersed in water carries a negative charge. It has now been found that if the colloidally dispersed particles, generally clay, in drilling muds are positively instead of negatively charged, the swelling of heaving-shale can be prevented or lessened to a great extent.

In the preparation of drilling mud it is generally desirable to use a finely divided solid which will have a high colloidal dispersion in water so as to produce a viscous, relatively stable mud with a minimum amount of solids. Bentonite has the aforesaid property and has been found to be a particularly satisfactory clay for use in drilling mud. Like other similar clays, bentonite carries a negative electrical charge when colloidally dispersed in an aqueous medium.

It has been found that such negatively charged colloids may be changed to positive colloids by the addition of one or more suitable water soluble chemical compounds from the group: salts of metals wherein the positive valence is three or more, such as thorium, aluminum, cerium and lanthanum salts; acid proteins such as acid gelatin or casein; basic dyes such as methylene blue, methylene green, methylene grey, methyl violet, Bismarck brown R, rhodamine B, acriflavine, chrysoidin Y and chrysoidin R. By the addition of one or more of the foregoing materials, the negatively charged colloidal clay or bentonite may be first neutralized and flocculated and upon a further addition, the neutralized clay may be deflocculated and remain in a stable dispersed state as positively charged particles. It is not desirable to use the flocculated, neutralized particles in drilling mud since these particles are not stably dispersed, the particles readily settling from an aqueous dispersion medium. When such a positively charged clay as, for example, bentonite, is dispersed in water and used as drilling mud, the shale in heaving-shale formations does not swell or slough off into the hole and the bentonite particles remain stably dispersed. The ability of the positively charged bentonite to prevent swelling of the shale is believed to be due to neutralization of the negative charges on the shale particles in the subsurface formation by the positive charges on the bentonite in the drilling mud with resultant formation of a flocculated film of shale and bentonite on the exposed surface of the shale formation in the bore hole. The flocculated material forms an extremely coherent layer and adheres tightly to the surface of the formation, thus substantially preventing further neutralization of charges between the clay of the shale formation and the bentonite in the drilling mud and at the same time substantially preventing the ingress of further water to the formation, thereby preventing hydration and swelling of the heaving shale.

In order to better determine the effect of some of the preferred materials upon negatively charged aqueous colloidal dispersions, mixtures of several basic water soluble dyes and bentonite were tested by means of cataphoresis experiments. The Burton apparatus was employed in the test. This apparatus is well known for determining the electrical charge on colloid particles. The results of the tests are given in Table I:

TABLE I

| Mixture No. | Kind of dye | 5% dye solution | 5% bentonite suspension | Charge on colloid |
|---|---|---|---|---|
|  |  | Cc. | Cc. |  |
| 1 | None | 0 | 100 | Neg. |
| 2 | Methylene blue | 1 | 20 | Do. |
| 3 | do | 2 | 20 | Do. |
| 4 | do | 3 | 20 | Do. |
| 5 | do | 4 | 20 | None |
| 6 | do | 7 | 20 | Do. |
| 7 | do | 10 | 20 | Do |
| 8 | do | 15 | 20 | Pos. |
| 9 | do | 20 | 20 | Do. |
| 10 | do | 20 | 80 | Solid [1] |
| 11 | do | 50 | 50 | Pos. |
| 12 | do | 50 | 50 | Do. |
| 13 | Malachite green | 50 | 50 | Sl. pos. |
| 14 | do | 80 | 20 | Do. |
| 15 | do | 67 | 33 | Pos. |
| 16 | Chrysoidin R | 50 | 50 | Do. |
| 17 | do | 75 | 25 | Do. |
| 18 | do | 25 | 75 | Solid [1] |
| 19 | do | 5 | 20 | None. |
| 20 | do | 10 | 20 | Pos. |
| 21 | do | 50 | 20 | Sl. pos. |
| 22 | Methyl violet | 5 | 20 | None. |
| 23 | do | 10 | 20 | Pos. |
| 24 | do | 20 | 20 | Do. |
| 25 | do | 40 | 20 | Do. |
| 26 | do | 50 | 50 | Do. |
| 27 | do | 75 | 25 | Do. |
| 28 | do | 25 | 75 | Solid [1] |
| 29 | do | 33 | 67 | Pos. |
| 30 | do | 40 | 60 | Do. |
| 31 | Bismarck brown R | 20 | 20 | Do. |
| 32 | do | 5 | 20 | None. |
| 33 | do | 10 | 20 | Pos. |
| 34 | do | 50 | 50 | Do. |
| 35 | do | 15 | 20 | Do. |
| 36 | do | 43 | 57 | Do. |
| 101 | Methylene green | 7.5 | 10 | None. |
| 102 | do | 10 | 10 | Pos. |
| 103 | do | 20 | 10 | Do. |
| 104 | Rhodamine B | 5 | 10 | Sl. pos. |
| 105 | do | 10 | 10 | Pos. |
| 106 | do | 20 | 10 | Do. |
| 107 | Chrysoidin Y | 1.5 | 1 | Sl. pos. |
| 108 | do | 2.0 | 1 | Do. |
| 109 | do | 4.0 | 1 | Do. |
| 110 | Methylene grey | 20 | 20 | None. |
| 111 | do | 30 | 20 | Do. |
| 112 | do | 40 | 20 | Sl. pos. |
| 113 | do | 80 | 20 | Pos. |
| 114 | do | 90 | 10 | Do. |
| 115 | Acriflavine | [2] 2.5 | 1 | Sl. pos. |
| 116 | do | [2] 5 | 1 | Pos. |
| 117 | do | [2] 10 | 1 | Do. |

[1] Unable to determine charge.
[2] 1% solution used.

In all of the examples shown in Table I, where the volume of dye solution plus the volume of bentonite solution was less than 100 cc., water was added to bring the mixture to this volume. From the results in Table I it will be seen that positive colloidal dispersions of bentonite may be readily formed by adding suitable quantities of methylene blue, chrysoidin R, methyl violet and Bismarck brown R to negatively charged, colloidally dispersed bentonite. Further tests revealed that the positively charged dispersed particles were as stably dispersed as the original negatively charged particles.

Samples of shale from heaving-shale formations encountered in actual drilling operations were obtained and the hydrating or swelling effect of the various colloidal dispersions listed in Table I, determined. When samples of these shales were placed in water or in drilling mud composed of the ordinary negatively charged bentonite dispersed in water, the shale swelled and disintegrated in a few hours, thereby conclusively showing that the sample was actually a heaving-shale type material and was readily susceptible to hydration. Other samples of the shale were placed in the various dye-bentonite mixtures listed in Table I.

TABLE II

| Mixture No. | Charge on colloid | Effect on heaving shale |
|---|---|---|
| Water | | Disintegrates in 3 hours. |
| 1 | Neg | Do. |
| 2 | do | Do. |
| 3 | do | Do. |
| 4 | do | Do. |
| 5 | None | Disintegrates in less than 12 hours. |
| 6 | do | Do. |
| 7 | do | Do. |
| 8 | Pos | Unchanged in five days. |
| 9 | do | Do. |
| 10 | (Solid) | |
| 11 | Pos | Unchanged in five days. |
| 12 | do | Do. |
| 13 | Sl. pos | Do. |
| 14 | do | Do. |
| 15 | Pos | Do. |
| 16 | do | Do. |
| 17 | do | Do. |
| 18 | (Solid) | |
| 19 | None | Disintegrates in less than 12 hours. |
| 20 | Pos | Unchanged in five days. |
| 21 | Sl. pos | Do. |
| 22 | None | Disintegrates in two days. |
| 23 | Pos | Unchanged in five days. |
| 24 | do | Do. |
| 25 | do | Do. |
| 26 | do | Do. |
| 27 | do | Do. |
| 28 | (Solid) | |
| 29 | Pos | Unchanged in five days. |
| 30 | do | Do. |
| 31 | do | Do. |
| 32 | None | Disintegrates in two days. |
| 33 | Pos | Unchanged in five days. |
| 34 | do | Do. |
| 35 | do | Do. |
| 36 | do | Do. |
| 37 | do | Do. |

The mixture numbers in Table II are the same mixtures as shown in Table I.

From a review of the results of Table II it will be seen that all of the mixtures tested in the cataphoresis experiments that showed particles carrying a negative charge or no charge at all, caused the heaving-shale samples to disintegrate comparatively rapidly. In those mixtures where the colloid was positively charged, the heaving-shale samples were unchanged after five days exposure, thus conclusively proving that positively charged colloidal, bentonitic mud containing basic dye will entirely prevent the swelling and hydrating of heaving shale.

Since it is frequently necessary to add weighting materials to drilling mud in order to increase the specific gravity and thereby provide a means of counteracting high gas pressures, it was considered advisable to determine whether or not stable, positively charged bentonite dispersions of high specific gravity could be prepared. Stability tests were carried out in the following manner: A 50 cc. sample of positively charged, weighted bentonitic mud containing barytes as the weighting agent, was poured into each of two 100 cc. graduates. After fifteen minutes the top 25 cc. in one graduate was weighed to determine the specific gravity of the mixture. After three days the specific gravity of the top 25 cc. of the other graduate was determined, a decrease in specific gravity in the second sample indicating that some of the weighting materials had settled out. Table III shows the results of these tests:

TABLE III

Stability of dye-bentonite-water mixtures weighted with "Baroid-O"

| Mixture | Composition of mixture | Original specific gravity | Sp. gr. of top 25 cc. after 3 days |
|---|---|---|---|
| A | 60 g. barites | 1.29 | 1.18 |
| B | 80 g. barites | 1.40 | 1.39 |
| C | 100 g. barites | 1.50 | 1.49 |
| D | 20 g. barites | 1.11 | 1.07 |
| E | 40 g. barites | 1.21 | 1.20 |
| F | 60 g. barites | 1.39 | 1.25 |
| G | 80 g. barites | 1.48 | 1.34 |
| H | 100 g. barites | 1.57 | 1.46 |

In samples A, B and C the mud consisted of 57 cc. of a 5% bentonite-water mixture to which had been added 43 cc. of a 5% solution of Bismarck brown dissolved in water. In the remaining samples the mud consisted of 50 cc. of a 5% bentonite-water mixture to which had been added 50 cc. of a 5% solution of methyl violet dissolved in water.

From the results of Table III it will be seen that the decrease in specific gravity of such mixtures after standing for three days is negligible. The results of these tests show that mixtures of positively charged, bentonitic drilling mud containing dye and a weighting agent may readily be prepared and are entirely satisfactory from the standpoint of stability. The effect of diluting the weighted mixtures with oil well brine was also determined. It was found that the effect of the brine was no more serious on the weighted dye-bentonite mud suspensions than on the ordinary drilling mud normally used. Since viscosity is also a very important characteristic of drilling mud, experiments were carried out to determine the various viscosity ranges in which weighted dye-bentonite mud could be prepared. Table IV shows the results of these experiments.

TABLE IV

Viscosity of weighted Bismarck brown R-bentonite-water mixtures

| Composition of mixture | Viscosity, marsh seconds [1] |
|---|---|
| 4.3% Bismarch brown R, 5.7% bentonite, 90% water +1 g. barites/cc | 362 |
| 3.4% Bismarck brown R, 4.6% bentonite, 92% water +0.8 g. barites/cc | 107 |
| 2.6% Bismarck brown R, 3.4% bentonite, 94% water +0.6 g. barites/cc | 46 |
| 2.2% Bismarck brown R, 2.8% bentonite, 95% water +0.5 g. barites/cc | 28 |

[1] 1500 cc. in funnel, time of flow of 1000 cc.

From the data of Table IV it will be seen that positively charged dye-bentonite muds may be prepared possessing practically any desired viscosity greater than that of water. From a large number of additional qualitative tests it has been found that the dye-bentonite mixtures also possess jell characteristics which may be varied over a wide range.

While various materials have been suggested herein as additives to drilling mud for changing negatively charged particles to positively charged particles, the invention is not limited to any particular material or method for effecting this change but includes the use of positively charged drilling mud by whatever means it is obtained. Although the principles of the invention may be applied in various ways, and the preferred materials used in widely varying quantities, it is preferred to use those water soluble materials such as salts of metals whose positive valence is three or more, acid proteins, or basic dyes in such quantities as will overcome the negative charge on the particles in bentonitic drilling muds and produce positively charged colloidally dispersed particles. The amount of additive required to produce positively charged particles may be readily determined by the Burton apparatus or other similar testing devices.

When two materials of opposite electrical charge react, the amount of each material which is affected is inversely proportional to the proportion of replaceable base which is present in a given weight of that type of particle. In view of the variations in the amount of replaceable base in the various dispersed particles such as bentonitic clays and in the varying degree of effectiveness with which the preferred materials impart positive charges to colloidally dispersed particles, it is apparent that the relative quantities used may vary over a rather wide range. The amount of the preferred material required may be readily determined by a cataphoresis test, an amount of additive being used which is somewhat in excess of the amount required to impart a positive charge to the dispersed particles. In general, the amounts of the preferred materials which are used fall between the ranges of one part of additive compound to ten parts of dry bentonite to three parts of additive compound to one part of dry bentonite. While the additive compound may be mixed with the bentonite in the dry state and the mixture subsequently dispersed in water as required, it is preferred to add the dye or other additive dry or dissolved in water to mud in which the bentonite is already dispersed.

The term "bentonite" as used herein is used in a generic sense as including all clays having highly colloidal characteristics, whether they are true bentonite or not. In describing the preferred drilling mud additives as water soluble, it is not intended to limit the invention to those materials that are completely soluble in water but to include all materials within the groups indicated which are soluble or dispersable in water to a sufficient extent to produce deflocculated bentonitic muds having positively charged particles.

While an effort has been made to explain the theory by which the positively charged colloidal particles in drilling mud provide drilling mud which prevents the heaving of heaving-shale formations, it will be understood that the invention is not to be limited to any particular theory of operation.

It is claimed:

1. The process of drilling wells which comprises circulating through the well bore, during the drilling operation, mud containing positively charged colloidally dispersed particles.

2. The process of drilling wells which comprises circulating through the well bore during the drilling operation, mud containing colloidally dispersed particles to which has been added material which is normally positively charged when dissolved in water, in sufficient quantity to produce postively charged colloidally dispersed particles.

3. The process of drilling wells which comprises circulating through the well bore during the drilling operation, mud containing colloidally dispersed particles to which has been added material which is normally positively charged when dissolved in water and selected from the group consisting of acid proteins, basic dyes and salts of metals wherein the metal has a positive valence of three or more, in sufficient quantity to produce positively charged colloidally dispersed particles.

4. Process in accordance with claim 3 in which the added material is methylene blue.

5. Process in accordance with claim 3 in which the added material is methyl violet.

6. Process in accordance with claim 3 in which the added material is Bismarck brown R.

7. A composition for use in well drilling mud comprising finely divided bentonite and basic dye, said dye being present in sufficient amount to produce positive charges on bentonite particles when the bentonite is colloidally dispersed in water.

8. A material in accordance with claim 7 in which the added material is methylene blue.

9. A material in accordance with claim 7 in which the added material is methyl violet.

10. A material in accordance with claim 7 in which the added material is Bismarck brown.

11. A drilling mud for use in drilling wells comprising bentonite particles colloidally dispersed in water and one or more added water soluble materials capable of producing positive charges on said bentonite particles, said added materials being present in sufficient quantity to positively charge said bentonite particles and selected from the group consisting of acid proteins, basic dyes and salts of metals wherein the metal has a positive valence of three or more.

12. A drilling mud in accordance with claim 11 in which the added material is methylene blue.

13. A drilling mud in accordance with claim 11 in which the added material is methyl violet.

14. A drilling mud in accordance with claim 11 in which the added material is Bismarck brown R.

15. Process in accordance with claim 3 in which the added material is methyl violet and where the quantity added is between approximately one part by weight of methyl violet to ten parts by weight of colloidally dispersed particles, to three parts by weight of methyl violet to one part by weight of colloidally dispersed particles.

16. Composition in accordance with claim 7 in which the added material is methyl violet and where the amount added is between approximately one part by weight of methyl violet to ten parts by weight of bentonite, to three parts by weight of methyl violet to one part by weight of bentonite.

17. A drilling mud in accordance with claim 11 in which the added material is methyl violet and where the amount added is between approximately one part by weight of methyl violet to ten parts by weight of bentonite, to three parts by weight of methyl violet to one part by weight of bentonite.

18. The process of drilling wells which comprises circulating through the well bore during the drilling operation, mud containing colloidally dispersed particles to which has been added sufficient basic dye to produce positive charges on the colloidally dispersed particles.

19. A composition for use in well drilling mud comprising finely divided bentonite and sufficient basic dye to produce positive charges on the bentonite particles when the bentonite is colloidally dispersed in water.

20. A drilling mud for use in drilling wells comprising mineral particles colloidally dispersed in water and sufficient water soluble basic dye to positively charge said colloidally dispersed mineral particles.

21. Method of preventing heaving of heaving shale formations encountered in a drilling operation comprising circulating drilling mud containing positively charged colloidally dispersed particles through the well bore in contact with the formations.

22. Method of preventing heaving of heaving shale formations encountered in a drilling operation comprising circulating drilling mud containing colloidally dispersed mineral particles and sufficient basic dye to produce positive charges on the particles, through the well bore in contact with the formations.

DONALD C. BOND.